(12) United States Patent  
Aota et al.

(10) Patent No.: US 7,036,707 B2
(45) Date of Patent: May 2, 2006

(54) FRICTION STIR WELDING METHOD, FRAME MEMBERS USED THEREIN, AND PRODUCT FORMED THEREBY

(75) Inventors: Kinya Aota, Hitachi (JP); Masakuni Ezumi, Kudamatsu (JP); Yasuo Ishimaru, Kudamatsu (JP); Hisanori Okamura, Tokai-mura (JP); Isao Funyuu, Takahagi (JP); Akihiro Satou, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 389 days.

(21) Appl. No.: 10/610,625

(22) Filed: Jul. 2, 2003

(65) Prior Publication Data

US 2004/0004109 A1 Jan. 8, 2004

Related U.S. Application Data

(60) Continuation of application No. 09/547,042, filed on Apr. 11, 2000, now Pat. No. 6,640,515, which is a division of application No. 09/025,070, filed on Feb. 17, 1998, now Pat. No. 6,050,474.

(30) Foreign Application Priority Data

Jul. 23, 1997 (JP) ................................. 9-196759

(51) Int. Cl.
*B23K 20/12* (2006.01)
*E04H 3/02* (2006.01)
*E04H 12/00* (2006.01)
*B61D 17/00* (2006.01)

(52) U.S. Cl. ..................... 228/112.1; 228/2.1; 14/14; 52/638; 52/690; 105/399; 105/410

(58) Field of Classification Search ............. 228/112.1, 228/2.1; 52/578, 633, 634, 638, 690; 14/3, 14/13, 14; 105/396, 399, 410
See application file for complete search history.

(56) References Cited

U.S. PATENT DOCUMENTS 4,341,917 A 7/1982 Martin (Continued)

FOREIGN PATENT DOCUMENTS

EP 0615481 9/1994

(Continued)

OTHER PUBLICATIONS

Dawes, "An Introduction to Friction Stir Welding and Its Development", *Welding & Metal Fabrication* (Jan. 1995), pp. 13, 14 and 16.

(Continued)

*Primary Examiner*—Kiley S. Stoner
(74) *Attorney, Agent, or Firm*—Antonelli, Terry, Stout & Kraus, LLP

(57) ABSTRACT

Disclosed is a friction stir welding technique which avoids occurrence of a dent, in a joining region, extending to a level beneath the joined surfaces. At end portions of the frame members to be joined, at the joining region, thickened parts which project toward the rotary body joining tool are provided. Two adjoining thickened parts, of adjacent members to be joined, can form a trapezoid shape. The rotary body joining tool has a small-diameter tip portion and a larger diameter portion. The rotary body joining tool is inserted in the thickened parts. In a state where the rotary body joining tool has been inserted small-diameter tip end first, to a level where the larger diameter portion of the rotary body joining tool overlaps the thickened part but does not extend below the upper surface of the non-thickened surfaces of the members joined, the rotary body is rotated and moved along the joining region. Even when a gap exists between two thickened parts, a desirable joining can be carried out. After the joining, the remaining parts of the thickened parts can be machined so as to form a smooth surface.

20 Claims, 10 Drawing Sheets

U.S. PATENT DOCUMENTS

| | | | |
|---|---|---|---|
| 5,098,007 A | 3/1992 | Tsuruda et al. | 228/125 |
| 5,388,529 A | 2/1995 | Tieberghien et al. | |
| 5,410,855 A | 5/1995 | Clausen et al. | 52/592.1 |
| 5,460,317 A | 10/1995 | Thomas et al. | 228/112.1 |
| 5,611,479 A | 3/1997 | Rosen | 228/112.1 |
| 5,649,399 A | 7/1997 | Kepets | |
| 5,697,511 A | 12/1997 | Bampton | 220/4.12 |
| 5,697,544 A | 12/1997 | Wykes | 228/2.1 |
| 5,713,507 A | 2/1998 | Holt et al. | 228/112.1 |
| 5,718,366 A | 2/1998 | Colligan | 228/112.1 |
| 5,769,306 A | 6/1998 | Colligan | 228/112.1 |
| 5,794,835 A | 8/1998 | Colligan et al. | |
| 5,813,592 A | 9/1998 | Midling et al. | 228/112.1 |
| 5,829,664 A | 11/1998 | Spinella et al. | 228/112.1 |
| 5,862,975 A | 1/1999 | Childress | 228/120 |
| 5,868,081 A * | 2/1999 | Raab | 108/161 |
| 5,888,114 A | 3/1999 | Slocum et al. | 446/128 |
| 5,893,507 A | 4/1999 | Ding et al. | 228/2.1 |
| 5,971,247 A | 10/1999 | Gentry | 228/2.1 |
| 5,971,252 A | 10/1999 | Rosen et al. | 228/112.1 |
| 5,972,524 A | 10/1999 | Childress | 428/615 |
| 5,975,406 A | 11/1999 | Mahoney et al. | 228/112.1 |
| 6,085,485 A | 7/2000 | Murdock | |
| 6,233,892 B1 | 5/2001 | Tylman | |
| 6,672,654 B1 * | 1/2004 | Yamada et al. | 296/205 |
| 6,691,484 B1 * | 2/2004 | Ezumi et al. | 52/592.1 |
| 6,722,286 B1 * | 4/2004 | Okamura et al. | 105/396 |
| 2001/0004992 A1 * | 6/2001 | Kawasaki et al. | 228/112.1 |
| 2001/0011673 A1 * | 8/2001 | Aota et al. | 228/112.1 |
| 2001/0015370 A1 * | 8/2001 | Matsunaga et al. | 228/112.1 |
| 2001/0023566 A1 * | 9/2001 | Ezumi et al. | 52/638 |
| 2002/0073888 A1 * | 6/2002 | Okada et al. | 105/396 |
| 2002/0119336 A1 * | 8/2002 | Kawasaki et al. | 428/544 |
| 2003/0056459 A1 * | 3/2003 | Ezumi et al. | 52/592.1 |
| 2004/0004109 A1 * | 1/2004 | Aota et al. | 228/112.1 |
| 2004/0245033 A1 * | 12/2004 | Saeki | 180/89.1 |

FOREIGN PATENT DOCUMENTS

| | | |
|---|---|---|
| EP | 0797043 A2 | 9/1997 |
| JP | 51111925 | 3/1975 |
| JP | 52123358 | 10/1977 |
| JP | 60166177 | 8/1985 |
| JP | 2246863 | 10/1990 |
| JP | 6-156272 | 6/1994 |
| JP | 7-33016 | 2/1995 |
| JP | 7505090 | 6/1995 |

OTHER PUBLICATIONS

T. Shinoda, et al., "324 Butt Welding of Plate Using Friction Stir Welding; Method Study of Friction Stir Welding", Welding Associate Japan Lecture Meeting Outline, No. 56 (Apr. 1995), pp. 208 and 209.

"The World's First Order for a Newly-Developed Welding Method, Friction Stir Welding".

"Two Prints dated Jun. 23, 1993 showing details from a video from the Welding Institute".

* cited by examiner

US 7,036,707 B2

FRICTION STIR WELDING METHOD, FRAME MEMBERS USED THEREIN, AND PRODUCT FORMED THEREBY

CROSS-REFERENCE TO RELATED APPLICATIONS

This application is a Continuation Application of application Ser. No. 09/547,042, filed on Apr. 11, 2000, now U.S. Pat. No. 6,640,515 which is a Divisional Application of application Ser. No. 09/025,070, filed Feb. 17, 1998, now U.S. Pat. No. 6,050,474 the contents of which are incorporated herein by reference in their entirety.

BACKGROUND OF THE INVENTION

The present invention relates to a friction stir welding method suitable for use in joining members of various materials, including, for example, aluminum alloy members.

A friction stir welding method is a method in which by rotating a round-shaped rod (a rotary body) inserted in a joining region between two members (e.g., but not limiting, two metal bodies, such as bodies each made of aluminum), and further by moving the rotary body along a joining line, the two bodies at the joining region are heated, and material thereof softened and plastically fluidized and thus the two bodies are solid-phase joined, e.g., are welded together at the joining region.

Conventionally, the rotary body comprises a small diameter portion which is inserted in the joining region and a large diameter portion which is positioned outside the joining region. The small diameter portion and the large diameter portion are positioned on the same axis. A side of the large diameter portion is rotated, whereby both the large and small diameter portions are rotated. A boundary portion between the small diameter portion and the large diameter portion can be inserted a little into the joining region. A joining according to the friction stir welding method can be applied to an abutting portion and an overlapping portion.

The above-stated prior technique is disclosed, for example, in Japanese patent announcement laid-open publication No. Hei 7-505090 (EP 0615480 B1); Dawes, "An Introduction to Friction Stir Welding and Its Development", in *Welding & Metal Fabrication* (January 1995), pages 13, 14 and 16; and by U.S. patent application Ser. No. 08/820,231, filed Mar. 18, 1997, the contents of which are incorporated herein by reference in their entirety.

This prior technique is also described in the article by T. Shinoda and Y. Rondoh, "324 Butt Welding of Plate Using Friction Stir Welding; Method Study of Friction Stir Welding", Welding Associate Japan Lecture Meeting Outline, No. 56 (April 1995), pages 208 and 209. This article discloses a rotary body (rotary tool) made of stainless steel, members to be welded (joined) made of pure aluminum (Al100), and the members to be welded having a plate thickness of 6 mm. The rotary body has a large diameter portion with a diameter of 20 mm, and a small diameter portion (cylindrical) with a diameter of 6 mm and a length (axially) of 5 mm. In operation, the rotary body rotates at 1000–2500 rpm, and moves along the two members to be welded at a speed of 1.0–8.0 mm/s.

In the article described in the foregoing paragraph, the members to be joined are made of aluminum. Alloys of aluminum are also suitable for welding by friction stir welding; other metals studied for welding by friction stir welding include copper, titanium and stainless steel. EP 0615480 BI, referred to previously herein, discloses friction stir welding of plastic (e.g., thermoplastic) materials. All of these materials can be welded by the process of the present invention.

SUMMARY OF THE INVENTION

According to various experiments of the friction stir welding method, a part of an upper face of a joining region of two members is machined as chips, by a rotation of the large diameter portion of the rotary body, and a dent is caused in the upper face of the joining region. At both sides of the dent, a thickened part is caused according to plastic deformation of the members.

It is easy to delete the thickened part; however, a putty working is required to correct a dent, etc., and a high manufacturing cost results.

Further, where a gap exists between end faces of the abutting faces of the two members before the joining is performed, a default such as a dent, etc., is generated at the joining region. As a result, a lowering in strength is caused, and this lowering in strength causes a problem particularly in a large-scale construction. The larger the members, the more a management in the above-stated gap becomes difficult (i.e., the more the gap occurs); accordingly, the dent becomes large, and, moreover, a default is generated easily.

In a case where the joining region is covered by another member, for example, the existence of the dent is not as much a problem, and there is no problem except for the strength problem (which, of course, can be a serious problem itself). However, in a side face, etc., of a car body of cars (e.g., railroad cars), it is necessary to remove the dent from a viewpoint of an outward appearance. Further, even in a case where the dent is not visible, the dent becomes a problem from an aspect of the performance (e.g., strength of the weld).

An object of the present invention is to prevent generation of a dent in a joining region when joining two members (e.g., but not limited to, two metal members, such as of aluminum alloy) by a friction stir welding method.

Another object of the present invention is to provide members, to be joined by friction stir welding, which avoid a dent in the joining region between the joined members.

Still another object of the present invention is to provide a friction stir welding method, and product manufactured thereby, whereby a dent can be avoided in the joining region between joined members, where the members joined are abutting each other before being joined or even where there is a small gap between the members before they are joined (but the members are adjacent each other).

The above-stated objects can be attained by a provision where at least one of the members to be joined has a thickened part, in cross section, at the joining region thereof with another member, the thickened part protruding toward the rotary body used to perform the friction stir welding. The rotary body has large and small diameter portions, e.g., made of a material or materials harder than the material of the members to be welded, the small diameter portion first being inserted in the joining region of the members to be joined, during the joining. The members to be joined are positioned adjacent each other, with the thickened part of one member being positioned adjacent the other member to be joined thereto by welding. Where both members have thickened parts, the thickened parts can be positioned adjacent each other in the joining (joint-forming) region, or only one thickened part need be positioned in the joint-forming region. The rotary body is then caused to enter between the two members, in the joining region, with the small diameter portion of the rotary body being inserted into the joint-forming region of the two members and the large diameter portion of the rotary body extending into the thickened part (but not below the thickened part). The rotary body is then moved along the members to be welded, in the joining region, with the rotary body inserted as described in the previous sentence to perform the friction stir welding. Due to provision of the thickened part, at the joint-forming region, a dent (depressed region) at the weld region, in the joined members, can be avoided. By positioning the rotary body such that the large-diameter portion thereof is inserted into the thickened part (overlaps with the thickened part), an excellent weld is achieved, while avoiding a dent in the welded joint. Advantageously, the large-diameter portion of the rotary body does not extend below the protruding portion of the thickened part, while moving the rotary body to perform the friction stir welding.

The thickened part of the member can be an integral part of the member, and, e.g., extends to the edge (of the member) which is to be positioned adjacent another member to which the member is to be welded.

Preferably, the protruding portion has a side, furthest from the weld location, which, in cross section, is sloped (e.g., makes an acute angle of less than 90° with the plane of the surface of the member (other than the protruding portion); see ? in FIG. 4). Desirably, this side furthest from the weld location makes an angle of 15°–60°, preferably 30°, with the plane of the surface of the member.

DETAILED DESCRIPTION OF THE INVENTION

One embodiment of the present invention, which is an application of the present invention for a car body of railway cars, will be explained referring to FIGS. 1–5.

Figure 5:
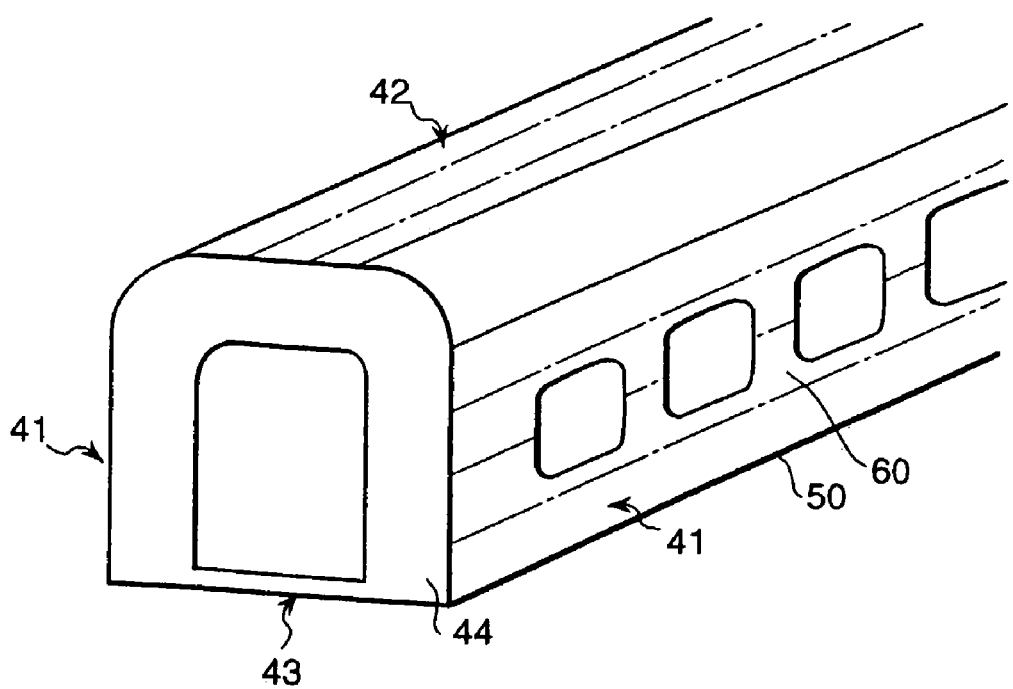
FIG. 5 is a perspective view showing a car body of a railway car.

In FIG. 5, a car body of a railway car is comprised of a side constructive body 41, a roof constructive body 42, a floor constructive body 43, and a constructive body 44 of an end portion at a longitudinal direction. The side constructive body 41 is constituted by arranging plural hollow extruded frame members (50, 60) and by joining contacting portions thereof. The joining is carried out as shown in FIG. 1.

Both the roof constructive body 42 and the floor constructive body 43 are similarly constituted. Connections between the side constructive body 42 and the roof constructive body 41 and the floor constructive body 43 are carried out using an MIG (metal electrode inert gas) welding, etc.

Figure 1:
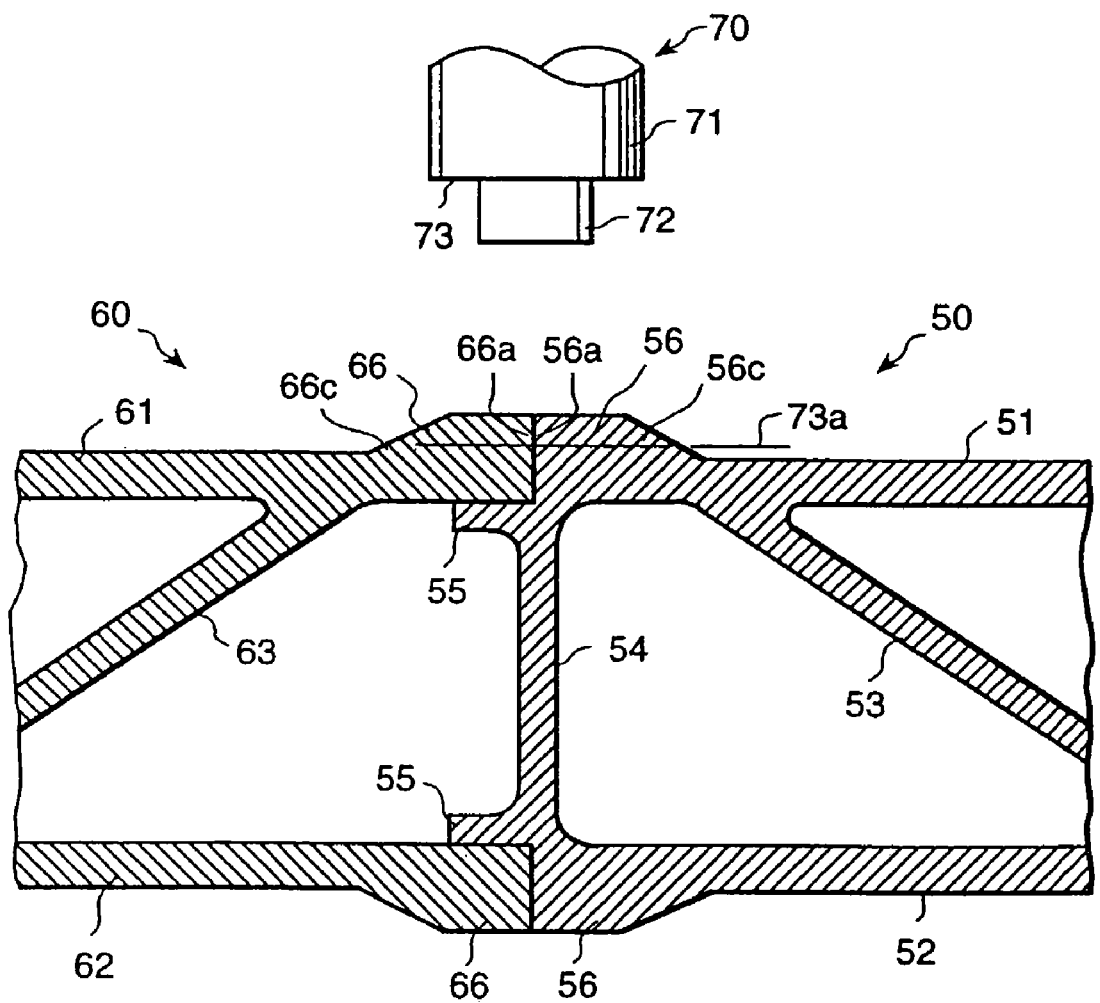
FIG. 1 is a longitudinal cross-sectional view showing a part of one embodiment according to the present invention.

FIG. 1 shows a joint portion of a hollow frame member which constitutes the side constructive body 41. The hollow frame members 50 and 60 are extruded frame members made from an aluminum alloy, for example. The hollow frame members 50 and 60 each comprise two plates 51, 52 and 61, 62, and diagonal plates (ribs) 53 and 63 which connect the plates 51 52 and 61 62. The plural diagonal plates 53 and 63 are arranged with a truss shape. The plates 53 and 63 are inclined in different directions. The plural diagonal plates 53 and 63 are arranged with a truss shape. The inclination directions of the plates 53 and 63 are alternately.

An end portion of one hollow frame member 50 is entered into an end portion of another hollow frame member 60. A vertical plate 54 for joining the plate 51 and the plate 52 is provided at a vicinity of the end portion of the hollow frame member 50. A reference numeral 54 is an extruded member for supporting the end portion of the hollow frame member 50.

On an extension line of a center of the thickness direction (in FIG. 1, a right and left direction) of the plate 54, the end portions of the members to be joined have thickened parts (protruding portions) of the two hollow frame members 50 and 60. Namely, an end portion (a center of a welding region W) of each of the hollow frame members 50 and 60, at which the joining is performed, is thickened so as to form the protruding portions.

The plates 51, 52 and 61, 62 are positioned to extend to the welding region W (see FIG. 2, for example) and are extruded and formed thick at end portions to form the thickened parts at a side of a front face (an outside in the thickness direction of the hollow frame member, or a side facing the tool for carrying out the joining working (welding), namely, a side facing the rotary body 70 which is a tool for friction stir welding.

The thickened parts 56 and 66 are formed respectively at the end portions of the plates 51, 52 and 61, 62. The front faces (the outer faces) of the thickened parts 56 and 66 are connected smoothly and inclined toward the front faces (the outer faces) of the plates (the non-thickened portions, which may be planar) 51, 52 and 61, 62. When two thickened parts 56 and 66 are aligned, then they can form a trapezoid shape illustrated in FIG. 1, although the present invention is not limited to the aligned parts 56 and 66 forming a trapezoid shape.

The rotary bodies 70 and 70, which are the joining tools for friction stir welding, are arranged respectively at an upper portion and at a lower portion of the joining regions of the hollow frame member. Each rotary body 70 has a small diameter round-shape rod 72 (a smaller diameter portion) at a tip end of a large diameter round-shape rod (a larger diameter portion) 71 which acts as a base portion. The large diameter portion 71 and the small diameter portion 72 are disposed on the same axis.

The lower side rotary body 70 is positioned downwardly substantially vertically below the upper side rotary body 70. The rotary bodies 70 and 70 can be separated along the joining line; however, to prevent bending of the hollow frame members 50 and 60, it is desirable to not separate the upper and lower rotary bodies a large distance in the direction along the joining line. The material of the rotary body 70 is harder than the materials of the hollow frame members 50 and 60.

By rotating the two rotary bodies 70 and 70, the small diameter portion 72 is inserted into the joining region of the hollow frame members 50 and 60. After that, the two rotary bodies 70 and 70 are moved in the horizontal direction along the longitudinal direction of the joining region of the hollow frame members 50 and 60. The two rotary bodies 70 and 70 are moved at the same time.

During the friction stir welding, at a side of the upper 20 side rotary body 70, a boundary portion 73 (a substantially flat shape portion), between the large diameter portion 71 and the small diameter portion 72 of the rotary body 70, is positioned spaced upward a little, at an upper portion 73a (at a side of a face of an apex of the thickened parts 56 and 66 and in an inner portion of the thickened parts 56 and 66), from an extension of an upper face of the general portion (the non-projecting portion) of the plates 51 and 61. That is, while the large diameter portion 71 of the upper side rotary body 70 extends below the upper face of the thickened part—(e.g., is inserted into the thickened part), it does not extend below the level of the non-projecting portion of the plates 51 and 61.

At a side of the lower side rotary body 70, the boundary portion 73 between the large diameter portion 71 and the small diameter portion 72 is positioned a little below an extension of a lower face of the general portion (the non-projecting portion) of the plates 52 and 62 (between the face side of the apex of the thickened parts 56 and 66 and in an inner portion of the thickened parts 56 and 66).

Namely, the boundary portion 73 between the large diameter portion 71 and the small diameter portion 72 is positioned at an outer side of the extension line of the face of the outer side of the non-projecting portion of the plates 51 and 52, and further is positioned in the inner portion of the thickened parts 56 and 66. In FIG. 1, the line 73a indicates a position of the boundary portion 73. In other words, the large diameter portion is inserted to a position (with respect to the upper rotary body) below the apex of the thickened part but not below the extension line of the non-projecting portion of the plates 51 and 52; the large diameter portion of the lower rotary body is correspondingly inserted.

In a case of performing the welding, the frame members 50 and 60 are mounted on a bed stand and are fixed thereto. No bed stand exists at a surrounding portion of the thickened part of the lower face. A rotating center of the rotary body 70 is a center of the joining region; namely, such center is a center of the thickness of the plate 54.

Figure 4:
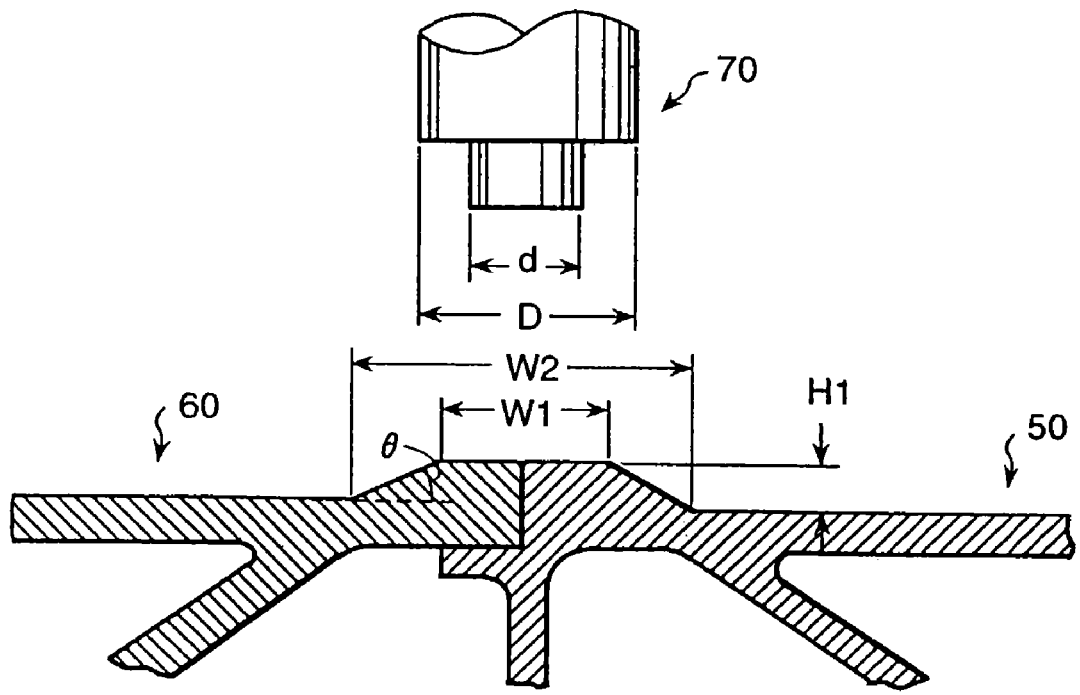
FIG. 4 is a view for explaining dimensions.

In FIG. 4, a relationship about the dimensions of the respective portions will be explained. A width Wi of an apex of the two thickened portions 56 and 66 (two welding portions 56 and 66), in a case where the two thickened portions 56 and 66 (two welding portions 56 and 66) are abutted, is larger than a diameter d of the small diameter portion 72 but is smaller than a diameter D of the large diameter portion 71. A width W2 of the basis portion of the two thickened portions 56 and 66 (two welding portions 56 and 66) is larger than the diameter D of the large diameter portion 71. A height Hi of the two thickened portions 56 and 66 (two welding portions 56 and 66) is longer than a length of the small diameter portion 72.

When a lower end of the large diameter portion 71 is positioned at the position 73a of the two thickened portions 56 and 66 (two welding portions 56 and 66), a tip end of the small diameter portion 72 reaches the member 55 or is positioned in the vicinity of the member 55.

Figure 2:
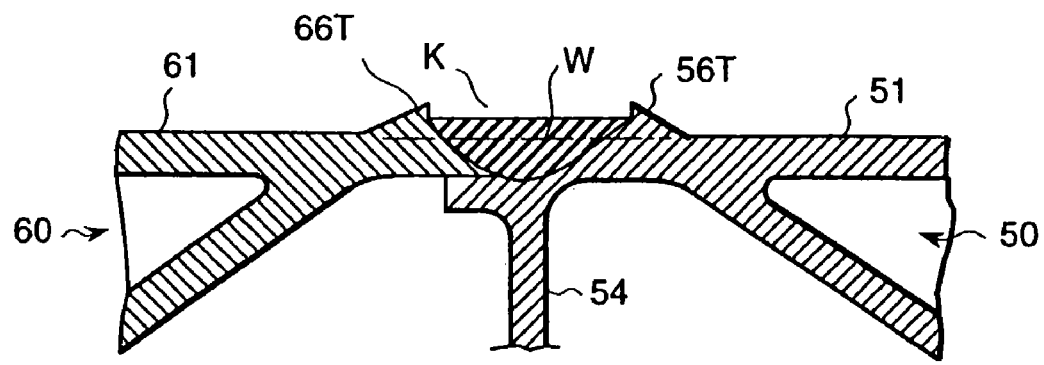
FIG. 2 is a longitudinal cross-sectional view showing a state after a friction stir welding of the structure of FIG. 1.

FIG. 2 shows a state in which the friction stir welding has been completed. FIG. 2 shows the joining (welding) region W at an upper side of FIG. 1. The joining region at a lower side is symmetrical with the upper side joining region. At a side of an outer face of the joining region W, the dent K is caused, directed toward an inner side of the hollow frame member. At both sides of the dent K there are thick parts 56T and 66T.

The thick parts 56T and 66T are remainders of the thickened parts 56 and 66. The thick parts 56T and 66T include matters which are plastically deformed. A bottom face of the dent K is positioned at the outer side portion 73a, outward from an outer face of the plates 51 and 61.

In a case where the upper side face of FIG. 1 is the outer face side of the car body of a railway car, an excessive part of the upper face joining region (a part extending outward from the faces of the general portions (non-thickened portions) of the plates 51 and 61 is machined by, illustratively, a grinding machine and the machining is performed so that the face at the upper face joining region has the same plan face as the upper faces of the general portion of the plates 51 and 61. Since the upper face joining region is machined, it is possible to easily carry out removal of the excessive part.

At the lower face side, similarly to the above, the dent K and the thick parts 56T and 66T exist; however, when they exist at the inner face side of the car body, because they are covered by make-up plates it is unnecessary to machine them.

Figure 3:
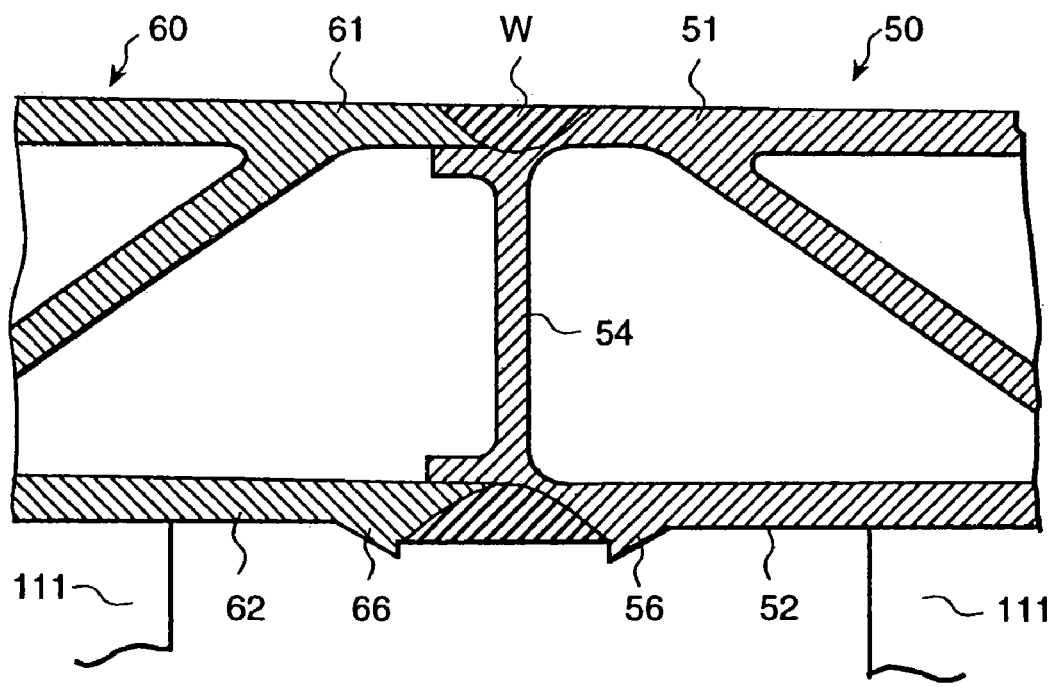
FIG. 3 is a longitudinal cross-sectional view showing a state in which after a friction stir welding of the structure of FIG. 1 has been carried out, a finishing process is carried out on one side.

FIG. 3 shows a state in which the frame members 50 and 60 mounted on a bed stand 111 are joined through the upper side and the lower side, and next under a state in which they are mounted on the bed stand 111, the upper face side thick parts 56T and 66T have been machined.

According to the above structure, an occurrence of the dent K extending to a level below the level of the faces of the general portions (non-thickened portions) of the plates 51 and 61 can be prevented substantially. As a result, it is not necessary to carry out padding welding and mending using the putty member.

Further, in the above-stated embodiment, the end portions 56a and 66a of the thickened parts 56 and 66 contact each other; however, in a case where a gap exists between the thickened parts, the base metal of the thickened parts 56 and 66 which has been fluidized under the friction stir welding is pushed into the gap. As a result, in a case of an existence of the gap, a default is not generated in the joining region.

Illustratively, when the height of the thickened part (HI in FIG. 4) is 1 mm, two members having a gap of 1 mm therebetween can be joined without default. Further, it is possible to position the dent K outside of an extension line of the outer face of the plates 51, 52 and 61, 62. Namely, the occurrence of the dent extending beyond the faces of the plates 51, 52 and 61, 62 can be prevented substantially and easily.

As seen in the foregoing, according to the present invention the two members to be joined can be in contact with each other, but need not be in contact; there can be a gap between the ends of the two members to be joined. Throughout the present disclosure, where it is described that the two members to be joined are adjacent (abutting) each other, the two members can be in contact or can have small gaps therebetween.

Illustratively, when the height of the thickened part (HI in FIG. 4) is 1 mm, two members having a gap of 1 mm therebetween can be joined without default. Further, it is possible to position the dent K outside of an extension line of the outer face of the plates 51, 52 and 61, 62. Namely, the occurrence of the dent extending beyond the faces of the plates 51, 52 and 61, 62 can be prevented substantially and easily.

Further, the thickened parts 56 and 66 of the joining region, when joined, can have a trapezoid shape; in comparison with a case where the thickened parts 56 and 66 are extruded with four-sided shapes, in the present invention no excessive part exists. As a result, the present invention can dispense with a small amount of the hollow frame member, and further it is possible to lessen the manufacturing cost.

Figure 6:
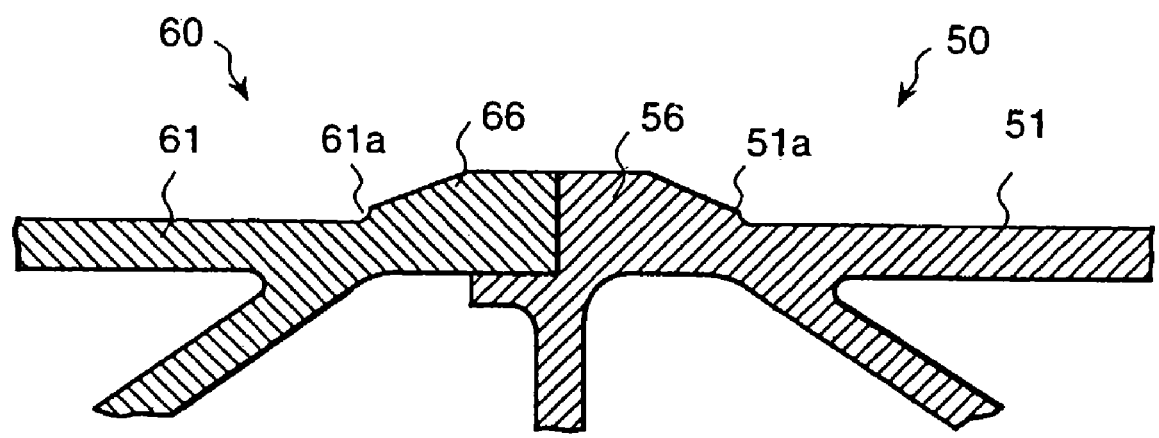
FIG. 6 is a longitudinal cross-sectional view showing a part of another embodiment according to the present invention.

Further, it is possible to lessen the machining amount by the grinding machine, since, e.g., only remaining portions of the thickened parts need be machined. Further, as shown in FIG. 6, after sides 51a and 61a of the thickened parts 56 and 66 are stood up a little from the outer faces of the non-thickened portions of the plates 51 and 61, it is possible to provide the trapezoid shapes to the thickened portions 56 and 66.

The plate 54 prevents the plates 51 and 61 from bending at the thickened parts 56 and 66, toward the inner side, due to the compressive force caused by the rotary bodies 70 and 70.

In FIG. 1, the right-end shape structure of the hollow frame member 50 may employ the left-end shape structure of the hollow frame member and also may employ the right-end shape structure of the hollow frame member 60. The shape structure of the hollow frame member 60 can employ similar structure. It is preferable to join the two hollow frame members.

Figure 7:
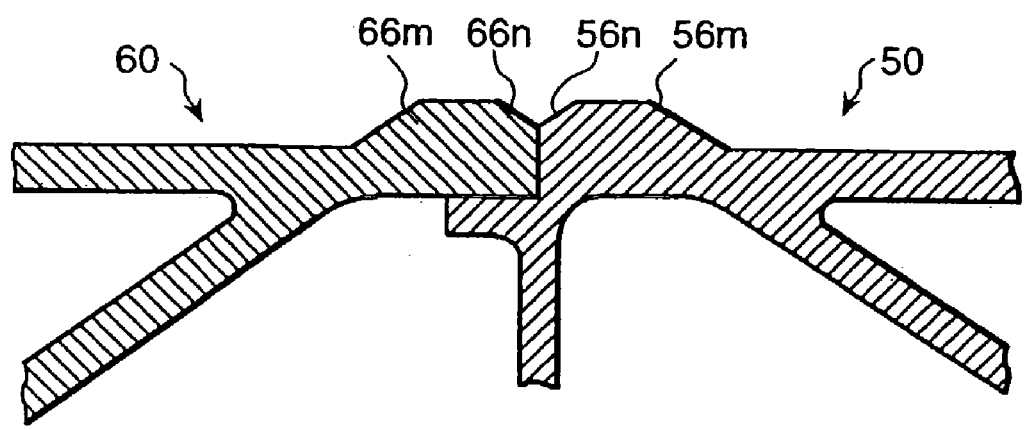
FIG. 7 is a lateral cross-sectional view showing a joining region of another embodiment according to the present invention.

The rotary body 70 is moved by detecting the abutting portion using an optical sensor. By detecting the slope faces 56c and 66c of the thickened parts 56 and 66, the position in the width direction of the rotary body 70 is determined. As shown in FIG. 7, the slope faces 56n and 66nm for sensing can be provided at a part to which the thickened parts 56m and 66m are opposite. The slope face 56n (66n) can be provided respectively to both of the thickened parts 56m and 66m or can be provided to one of the thickened parts 56m and 66m.

In each of the above-stated embodiments, the two end faces 56a and 66a of the two joining regions are parallel to the axis center of the rotary body 70; however, the two end faces 56a and 66a can be inclined against the axis center of the rotary body 70. For example, the end face 56a of one member 50 is inclined and against to this end face 56a the end face 66a of another member 60 can be overlapped at the upper side.

According to this structure, even when the gap between the two end faces is large, according to the rotation of the rotary body 70 it is possible to prevent the outflow of the fluidized metal from the extruded member 55. This structure is suitable to the connection of mutual pipes.

A joining apparatus will be explained referring to FIG. BA. The hollow frame members 50 and 60 are mounted on the bed stands 111, 111 and fixed by a cramp 113. The abutting portions of the two hollow frame members 50 and 60 are temporarily welded suitably.

An upper side rotary body 70 is hung down from a running body 121 which is run toward a width direction. The running body 121 is moved along an upper portion frame of a gate type running body 122. The running body 122 is run along a rail 123 which is arranged to both sides, along a longitudinal direction, of the hollow frame members 50 and 60.

A lower side rotary body 70 is provided on a running body 131 which is arranged between two seats 111 and 111. The running body 131 is mounted on the running body 132 and is moved toward the width direction.

The running body 132 is run along the rail 133 and also along the longitudinal direction of the hollow frame members 50 and 60. The lower side rotary body 70 is provided on a lower portion of the upper side rotary body 70. The running bodies 121 and 131 also move the rotary bodies 70 and 70 in the vertical direction.

Plural rollers 124 and 134 for pressing the hollow frame members 50 and 60 are provided on the running bodies 121 and 131. The rollers 124 and 134 are arranged at a front portion of the rotary bodies 70 and 70 and on both sides of the thickened parts 56 and 66. The rollers 124 and 134 are provided with plural rows along the running direction as occasion demands. Rollers can be added in front of and to the rear of the rotary body 70.

The running bodies 121 and 131 have a sensor (not shown in the figure) which can detect the position to be joined. The running bodies 121 and 131 are moved in the width direction in response to a detection made by the sensor. In a case a laser is used as the sensor, the slope faces 56c, 56c and 66c, 66c are found and a center to be joined is detected.

After the joining of the upper face and the lower face of the hollow frame members 50 and 60 using the rotary bodies 70 and 70, and under a state in which the hollow frame members 50 and 60 are mounted on the bed stands 111 and 111, the hollow frame members 50 and 60 are finished smoothly by machining off the thick parts of the upper face.

When the machining grinding working is carried out by a manual working, the friction stir welded structure can be finished more smoothly. For this reason, the thick part is provided at the upper face in order to be able to carry out the machining working.

Further, first of all, since the thick part is first machined using the machine, which leaves a little of the thick part and after that the remaining thick part is machined by manual working, it is possible to shorten the cutting working. In this case the rotary body 70 leaves a rear portion of running body 121 unoccupied, and the cutting tool is provided on the running body 121. And in a case where the rotary body 70 is rotated, the cutting tool carries out the cutting working.

Figure 8A:
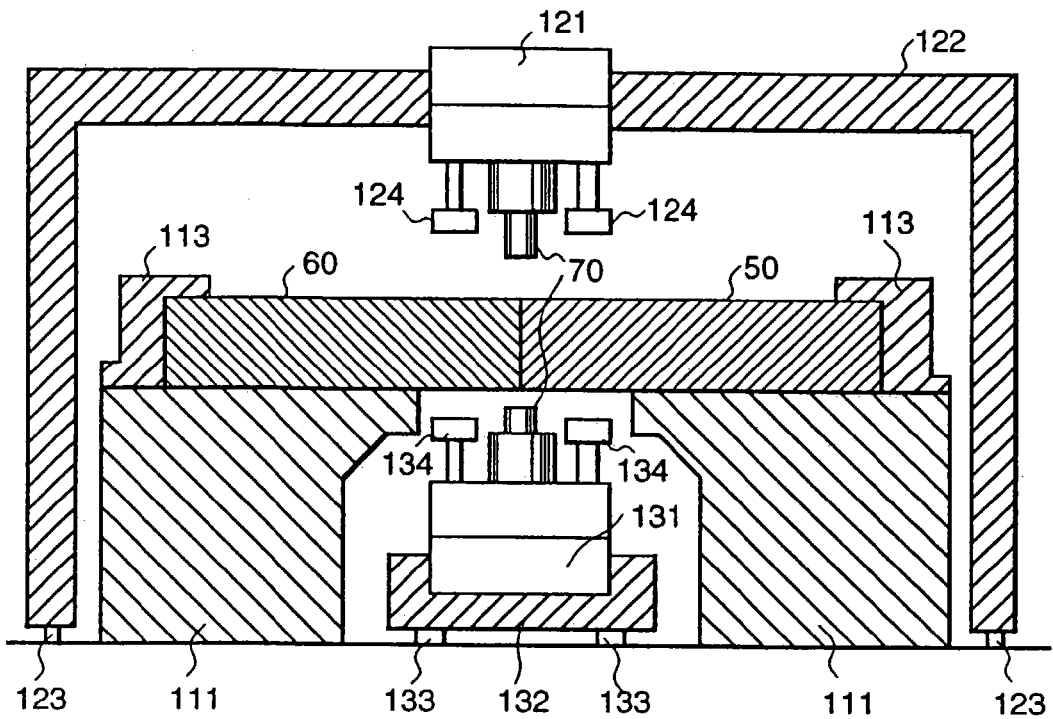
FIG. 8A is a longitudinal cross-sectional view showing a joining apparatus of one embodiment according to the present invention.
Figure 8B:
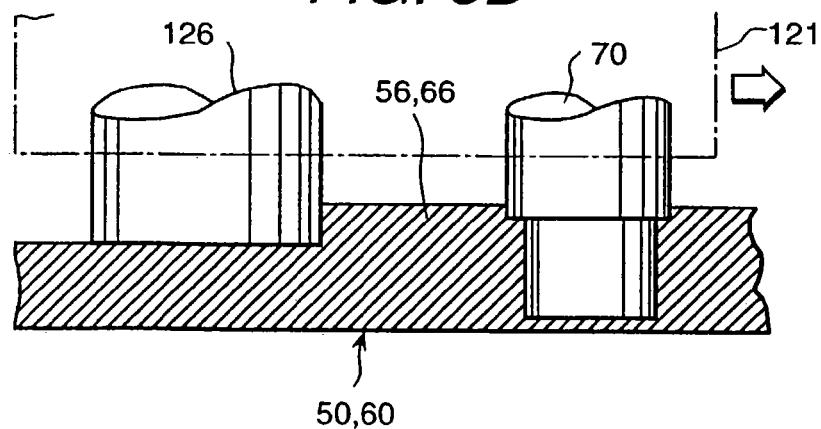
FIG. 8B is a longitudinal cross-sectional view of part of another embodiment according to the present invention.
Figure 8C:
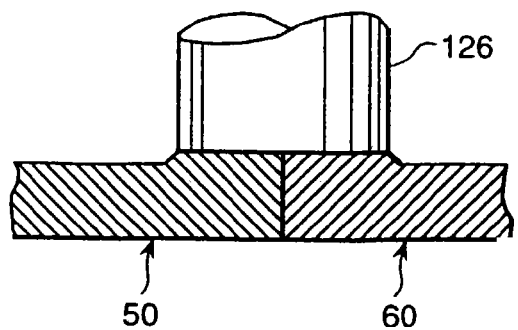
FIG. 8C is a left-side view of FIG. 8B.
Figure 8D:
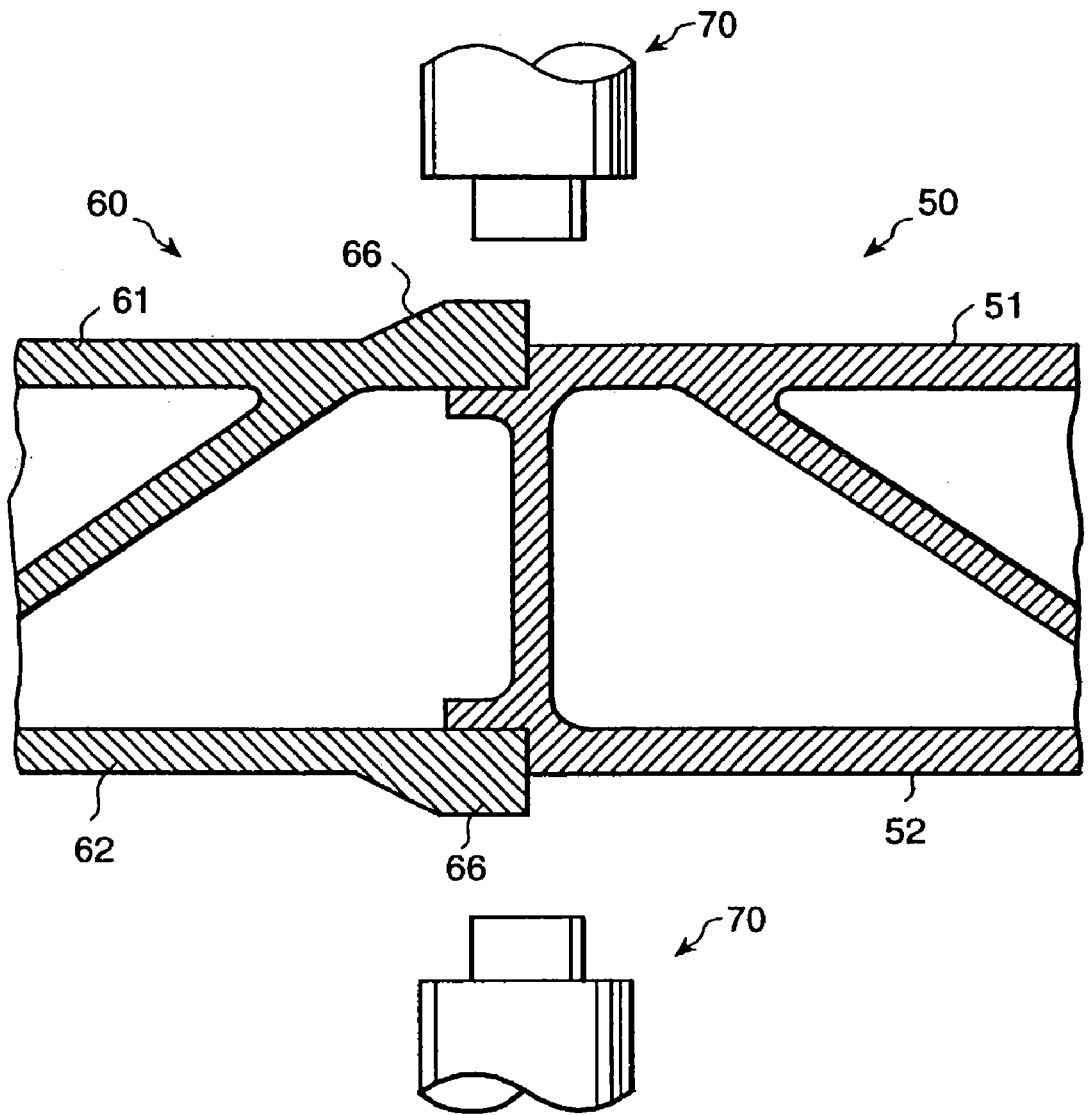
FIG. 8D is a longitudinal cross-sectional view of a part of a further embodiment according to the present invention.

For example, as shown in FIGS. 8B and BC, to the rear of the rotary body 70 of the upper face side, an end milling machine 126 is provided on the upper face side running body 121. The end milling machine 126 cuts off the thick parts 56T and 66T. A lower end of the end milling machine 126 is positioned at an upper portion a little from the upper faces of the upper face plates 51 and 61 of the hollow frame members 50 and 60. A diameter of the end milling machine 126 is sufficiently larger than the widths of the thick parts 56T and 66T which are positioned at the above-stated position. The rollers 124 and 134 push down a vicinity of the end milling machine 126 from an upper portion and a lower portion and therefore a cutting amount by the end milling machine 126 is made uniformly.

In the above-stated embodiments, a pair of the hollow frame members have respectively the thickened parts at the end portions; however, as shown in FIG. SD, it is possible to constitute a case where only one of the hollow frame members has a thickened part. A metal of the thickened part 66 is moved at a clearance between the hollow frame members 50 and 60 and an upper face of the plate of the hollow frame member 50. Further, similarly to the above, in one hollow frame member 60 the thickened part is formed at the upper face plate 61, and in another hollow frame member 50 the lower face 52 has the thickened part. In the above-stated embodiments, the frame member (e.g., an extruded frame member) is exemplified as a hollow frame member; however, it is possible to apply the present invention to a non-hollow, e.g., extruded, frame member. Hereinafter, such embodiments will be explained.

Figure 9:
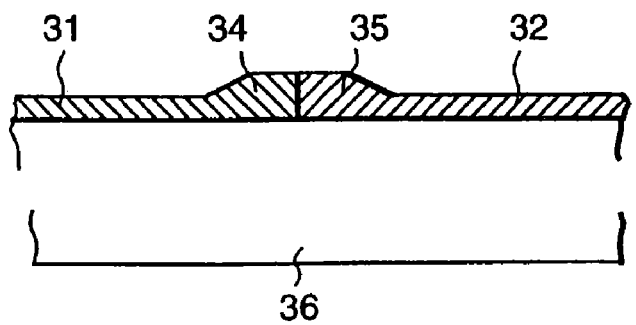
FIG. 9 is a longitudinal cross-sectional view showing a joining region of a further embodiment according to the present invention.

FIG. 9 shows an example of a joint structure which has the thickened parts 34 and 35 at the end portions of the plate-shape extruded frame members 31 and 32, and the frame members 31 and 32 are joined by abutting the thick parts 34 and 35 to each other and friction stir welding. During the welding, the extruded frame members 31 and 32 are arranged on backing tools (bed stands) 36. To prevent the backing tools from joining with the joining region W, those backing tools 36 are made of materials harder than the materials of the extruded frame members 31 and 32.

Figure 10:
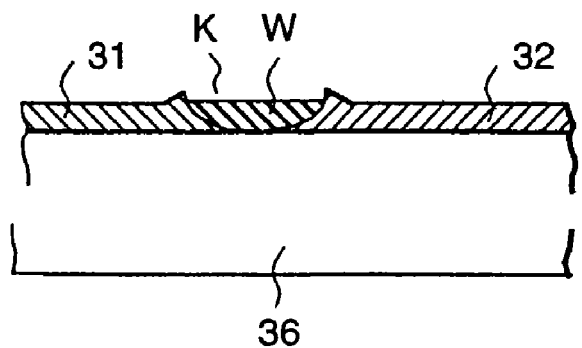
FIG. 10 is a longitudinal cross-sectional view showing a welded structure after a friction stir welding of the structure of FIG. 9.

When the rotary body 70 is rotated and moved along the abutting face of the joint, the joining region W shown in FIG. 10 can be obtained. The conditions for the rotary body 70 against the thickened parts 34 and 35 are similar to those of the above-stated embodiments.

Figure 11:
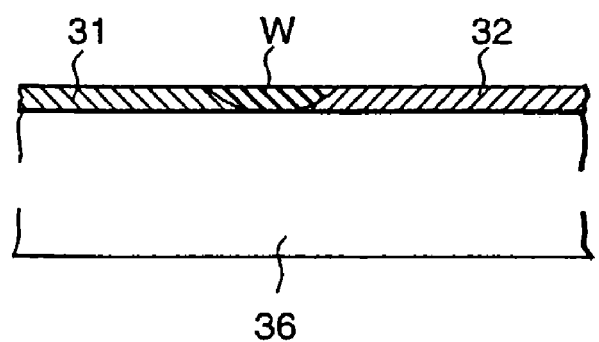
FIG. 11 is a longitudinal cross-sectional view showing the resulting structure after a thicker part of the structure in FIG. 10 is finished smoothly.

Next, as shown in FIG. 11, the dent K and the thick parts are removed smoothly using the grinding machine. The roller 124 of the joining apparatus is similar to those of the above-stated embodiments.

Further, in a case where the extruded frame member, etc., has only one joining region, in the embodiment shown in FIG. 8A, in place of the lower side rotary body 70, a roll for supporting the extruded frame member can be arranged. With this structure, it is unnecessary to support a whole face of the frame members 31 and 32; as a result the bed stand structure can be simplified.

Figure 12:
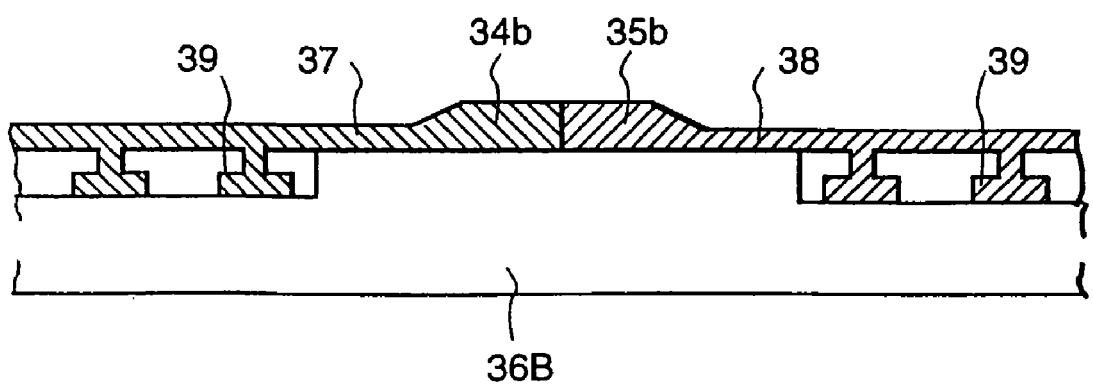
FIG. 12 is a longitudinal cross-sectional view of a joining region of another Embodiment according to the present invention.
Figure 13:
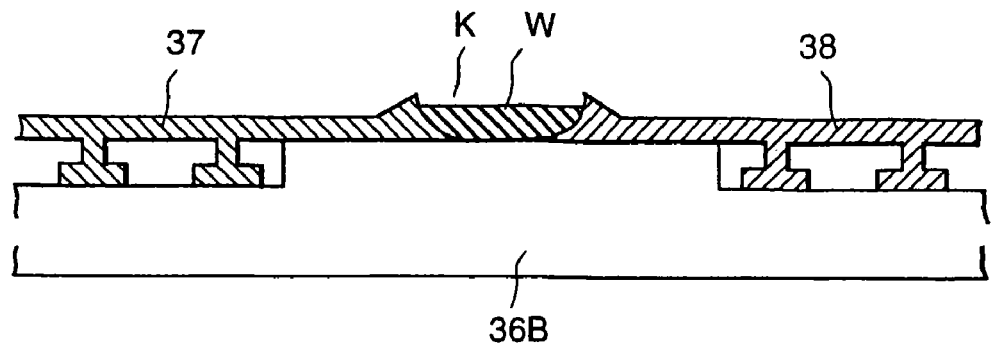
FIG. 13 is a longitudinal cross-sectional view showing the resulting structure after a friction stir welding of the structure shown in FIG. 12.
Figure 14:
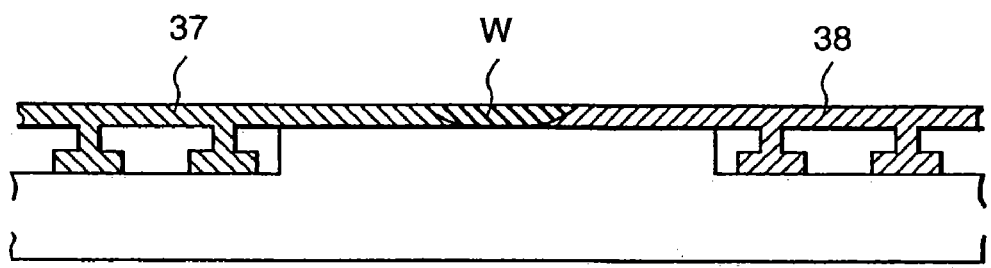
FIG. 14 is a longitudinal cross-sectional view showing the resulting structure after a thicker part of the structure shown in FIG. 13 is finished smoothly.

An embodiment shown from FIG. 12 to FIG. 14 shows a case where one face of each of the frame members 37 and 38 has plural ribs 39; and at an opposed face to the face having the ribs 39 the extruded frame members 37 and 38, having the thickened parts 34b and 35b, are joined by friction stir welding. The bed stand 36B mounts the lower-ends of the ribs 39 and the lower faces of the thickened parts 34 and 35. The friction stir welding is performed similarly to the above-stated embodiments.

Figure 15:
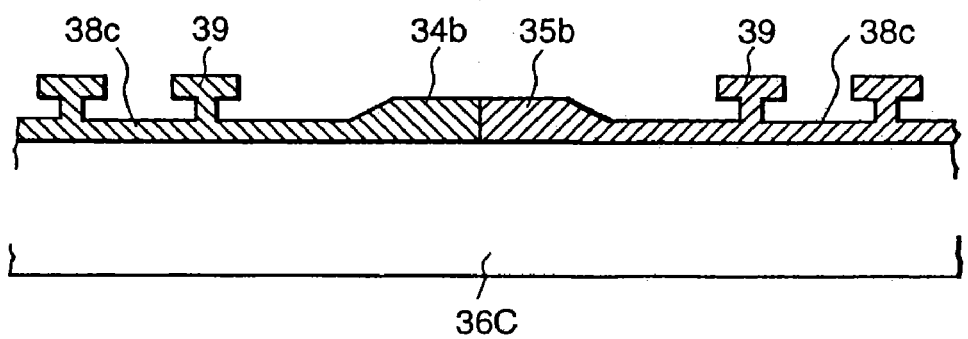
FIG. 15 is a longitudinal cross-sectional view of a joining region of another embodiment according to the present invention.
Figure 16:
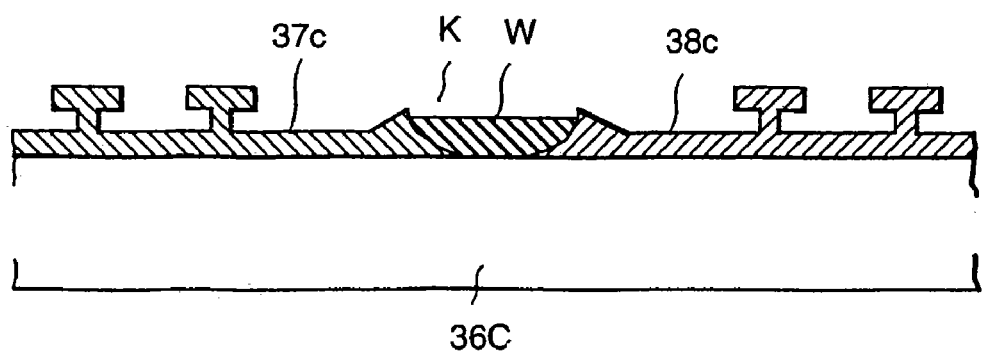
FIG. 16 is a longitudinal cross-sectional view showing the resulting structure after a friction stir welding of the structure shown in FIG. 15.

An embodiment shown from FIG. 15 to FIG. 16 shows a case where the extruded frame members 37c and 38c, having the thickened parts 34b and 35b, are provided at a side of the ribs 39. With this structure, a side of a bed stand 36C becomes flat.

As a result, in a case where at the opposite side of the ribs 39 a little unevenness is permitted, it is possible to delete the finishing process for making the joining smooth, so that the joined structure can be manufactured at a low cost. The joining region W is a good joining region and a predetermined thickness thereof can be obtained.

Figure 17:
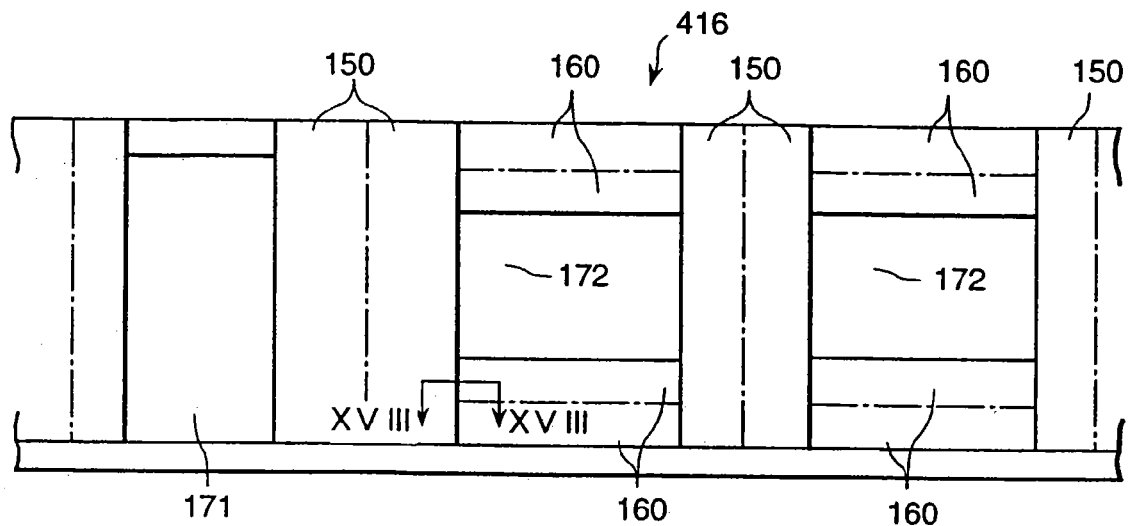
FIG. 17 is a front view of a side structure body of a railway vehicle.

One embodiment shown from FIG. 17 to FIG. 19 will be explained. In FIG. 17, a side structure body 416 of a railway vehicle is comprised of plural extruded frame members 150 and 160. Each of the extruded frame members 150 and 150 between an entrance and exit port 171 and a window 172, and between the window 172 and the window 172, extend in a longitudinal direction in FIG. 17 (that is, have their length extending in this longitudinal direction). Each of the extruded frame members 160 and 160 at the lower portions of the window 172 and at the upper portions of the window 172 extend in a lateral direction in FIG. 17 (that is, have their length extending in this lateral direction). Namely, the extruded frame members 150 and the extruded frame members 160 extend in directions (that is, have their lengths) orthogonal to each other. The extruded frame members 150 and 150, which extend in (have their lengths extending in) the same direction, are joined to each other, and the extruded frame members 160 and 160, which extend in (have their lengths extending in) the same direction, are joined to each other, by providing the thickened parts, similarly to the above-stated embodiments.

Figure 18:
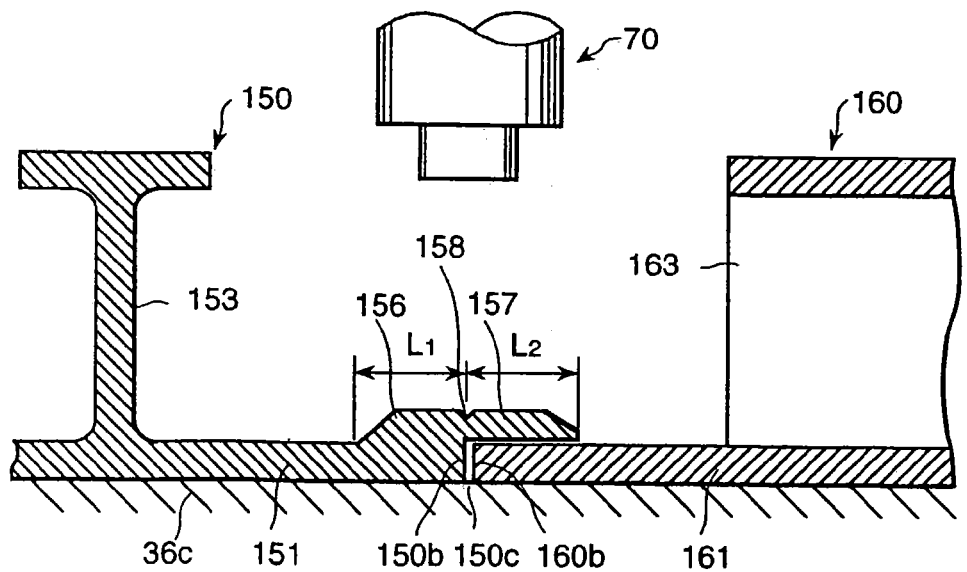
FIG. 18 is a cross-sectional view taken along the line XVIII-XVIII of FIG. 17.
Figure 19:
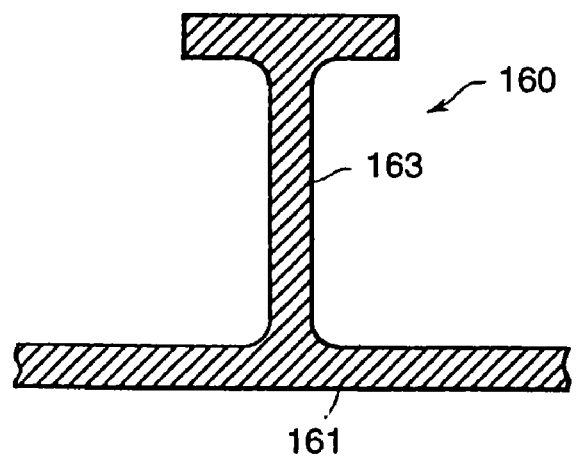
FIG. 19 is a right-side view of FIG. 18.

An intersecting portion of the directions that the frame members 150 and 160 extend is shown in FIG. 18. FIG. 18 shows a condition before the friction stir welding. The extruded frame members 150 and 160 have a rib 153 and a rib 163 at one side of the plates. The extruded frame members 150 and 160 are not the hollow frame members. The extruded frame members 150 and 160 mount the plate 151 and the plate 161 on a bed stand 36C. The ribs 153 and 163 direct toward the upper portions. The sides of the ribs 153 and 163 are the inner side of the car, and the sides of the plates 151 and 161 are the outer side of the car.

The end portion of the extruded frame member 150 is extruded to a side of the rib 153 and constitutes a thickened part 156. The thickened part 156 is extruded further toward the extruded frame member 160 to be welded and constitutes an extruded part 157. The extruded part 157 is overlapped with an inner side of the plate 161 of the extruded frame member 160 (the side of the rib 163). The rib 163 of the part of the extruded part 157 is cut off and removed. Illustratively, an extruded amount L2 of the extruded part 157 is the same as a width Li of the thickened part 156. Namely, the extruded part 157 corresponds to the thickened part 156. A tip portion of the extruded part 157 has an oblique side surface similarly to that of the thickened part 156.

By inserting the rotary body 70 from an upper portion, when the friction stir welding is carried out, since the extruded part 157 exists overlying a clearance 150c between the end portions 150b and 160b of the two extruded frame members 150 and 160, the metal of the extruded part 157 is supplied to the clearance 150c. Further, the metal is supplied also to the upper portion of the extruded frame member 60. As a result, in comparing a welding formed using structure having both thickened part 156 and extruded part 157 with a welding formed with structure which did not have the thickened part 156 and the extruded part 157, and further in comparing a welding formed using structure having both thickened part 156 and extruded part 157 with a welding formed with structure which had thickened part 156 but did not have the extruded part 157, a good welding can be obtained.

Since by cutting off the rib 163 of the extruded frame member 160 and the extruded frame member 160 is overlapped by the extruded part 157, the plate 161 at the vicinity of the extruded part 157 can be pressed down, and a good welding can be obtained.

A triangular-shaped groove 158 is provided at an outer face of the thickened part 156 which is positioned between the end portion 150b of the extruded frame member 150 and the end portion 160b of the extruded frame member 160. This groove 158 works a role of a positional mark for determining initially the position of the rotary body 70. This groove 158 further works a role of a mark for the sensor.

Figure 20:
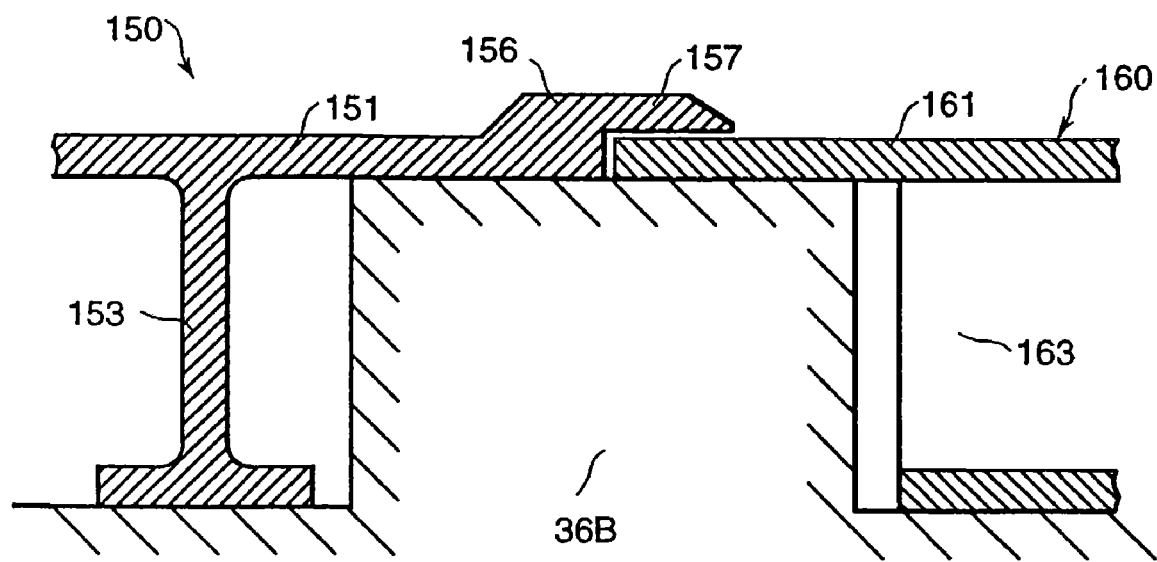
FIG. 20 is a longitudinal cross-sectional view of a part of a further embodiment according to the present invention.

FIG. 20 shows a case where the thickened part 156 and the extruded part 157 are not provided at the side of the rib 153. The ribs 153 and 163 are mounted on a bed stand 36B. The thickened part 156, the extruded part 157 and the plates 151 and 161 surrounding these parts are mounted on a bed stand which projects toward an upper portion from the stand 36B. The rib 163 at the vicinity of the end portion of the extruded frame member 160 is cut off. The thickened part 156 and the extruded part 157 of the extruded frame member 150 are positioned at the side of the plate 151 (the outer face side of the car)

In a case of the welding of the extruded frame members in which the extruded direction is orthogonal, it is possible to use structure having only the thickened part 156 and not the extruded part 157. Further, the provision of the extruded part toward the adjacent member can be adapted to the hollow extruded frame member, etc. Further, the provision of the extruded part can be adapted to joining two extruded frame members which are not orthogonal, namely, to the welding of two parallel members. The above method can be adopted to mutual honeycomb panels. Each honeycomb panel comprises two face plates, a honeycomb core member arranged between the two face plates, and a flange member arranged at a surrounding portion of the core member, etc.

The object matter to be joined can be pipes, etc. In this case, the plate of the above-stated embodiments will be replaced with a cylinder suitably.

Through use of the present invention, dents extending below the surfaces of the joined members can be avoided. Therefore, finishing of the joined members, to provide a smooth surface extending across the joint between the joined members, can be simplified.

Furthermore, even when there is a gap (or gaps) between the members to be joined by the friction stir welding and these gaps are large, dents extending below the surfaces of the joined members can be avoided, simplifying finishing work in providing a smooth surface extending across the joint.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An extruded frame member adapted to be welded by friction stir welding, comprising a plate having plural ribs at only one face of said-plate, said plate having a second face opposite to said one face, an end of the plate extending substantially in a plane between said one face and said second face, wherein at least one end portion, extending from said end of said plate in a width direction, of said extruded frame member, is provided with a raised portion which projects to an outer side in a thickness direction of said extruded frame member, and is provided in a side of said plural ribs, from said one face on which said plural ribs are provided of said plate, said raised portion being where said friction stir welding is carried out, wherein said at least one end portion, including said raised portion, is adapted to be friction stir welded from an upper side of said raised portion; and said raised portion includes a first part that extends above said end portion and a second part that extends in a direction substantially in parallel with said end portion of said extruded frame member and beyond said end of said plate, said second part being formed continuously with said first part.

2. An extruded frame member adapted to be welded by friction stir welding, having two plates and plural plate members connecting said two plates, said two plates respectively having ends which are each in substantially a same plane, said ends of said two plates being in substantially a same plane, said plate having plural ribs at only one face of said plate, said plate having a second face opposite to said one face, an end of said plate extending substantially in a plane between said one face and said second face, wherein end portions, extending from said ends in a width direction, of said two plates, have a raised portion which projects to an outer side in a thickness direction of said extruded frame member and are provided in a side of said plural ribs, said raised portion being where said friction stir welding is carried out, wherein said end portion, including said raised portion, is adapted to be friction stir welded from an upper side of said raised portion;

said raised portion includes a first part that extends above said end portion and a second part that extends in a direction substantially in parallel with said end portion and beyond said respective end of said two plates, said second part being formed continuously with the first part, only said raised portion, of said extruded frame member, extending beyond said ends;

thereby on both of said respective raised portions of said two plates, friction stir welding is carried out.

3. An extruded frame member according to claim 2, wherein said plate member is attached to said at least one of the two plates, having the raised portion projecting from an end portion thereof, at the end portion having the raised portion projecting therefrom; and wherein said plate member extends in the thickness direction of the extruded frame member, between the end portion having the raised portion and the other plate.

4. An extruded frame member according to claim 1 wherein said raised portion includes a first side forming an end part of the extruded frame member, at said at least one end portion, and wherein said raised portion also includes a sloped portion overlying and extending from said plate from which said raised portion projects, and forming a second side of the raised portion opposite said first side of the raised portion.

5. An extruded frame member according to claim 4, wherein said sloped portion extends from said plate, from which said raised portion projects, to an apex of the raised portion.

6. An extruded frame member according to claim 1, wherein said sloped portion makes an acute angle of less than 90° with said plate, from which said raised portion projects.

7. An extruded frame member according to claim 6, wherein said acute angle is in a range of 15°–60°.

8. An extruded frame member according to claim 1, wherein said extruded frame member is adapted to be friction stir welded using a rotary tool having a relatively large diameter portion and a relatively small diameter portion having a length and extending from the relatively large diameter portion, and wherein a height of the raised portion is greater than said length of the relatively small diameter portion.

9. An extruded frame member according to claim 1, wherein said raised portion is integral with said plate.

10. An extruded frame member according to claim 1, wherein said extruded frame member is made of a material adapted to be friction stir welded.

11. An extruded frame member according to claim 1, wherein said raised portion provides material for a joint formed by said friction stir welding.

12. An extruded frame member according to claim 2, wherein said raised portion includes a sloped portion, forming a side of the raised portion opposite a side of the raised portion closest to an edge of the extruded frame member.

13. An extruded frame member according to claim 12, wherein said sloped portion makes an acute angle of less than 90° with said at least one of said two plates.

14. An extruded frame member according to claim 2, wherein said friction stir welding is carried out using a rotary tool having a relatively large diameter portion and a relatively small diameter portion having a length and extending from the relatively large diameter portion, and Wherein a height of the raised portion is greater than said length of the relatively small diameter portion.

15. An extruded frame member according to claim 2, wherein said raised portion is integral with said at least one of said two plates.

16. An extruded frame member according to claim 2, wherein said extruded frame member is made of a material adapted to be friction stir welded.

17. An extruded frame member according to claim 1, wherein each of said at least one end portion includes an end face forming the end of the extruded frame member, and said end face is substantially perpendicular to said one face or said another face of said plate, from which said raised portion projects.

18. An extruded frame member according to claim 1, wherein said raised portion, in cross-section, has a quadrilateral shape.

19. An extruded frame member according to claim 1, wherein said extruded frame member is adapted to be friction stir welded to another frame member abutted to said at least one end portion of the extruded frame member, with said another frame member extending from said plate at a position substantially within a thickness of said plate when said friction stir welding is carried out.

20. An extruded frame member according to claim 19, wherein said another frame member has a face, and said face of said another frame member is substantially coplanar with a face of said plate when said friction stir welding is carried out.

* * * * *